United States Patent
Goto et al.

(10) Patent No.: US 10,225,725 B2
(45) Date of Patent: Mar. 5, 2019

(54) BASE STATION DEVICE AND TERMINAL DEVICE

(71) Applicant: Sharp Kabushiki Kaisha, Sakai-shi, Osaka (JP)

(72) Inventors: Jungo Goto, Sakai (JP); Osamu Nakamura, Sakai (JP); Daiichiro Nakashima, Sakai (JP); Yasuhiro Hamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 95 days.

(21) Appl. No.: 15/110,778

(22) PCT Filed: Jan. 6, 2015

(86) PCT No.: PCT/JP2015/050189
§ 371 (c)(1),
(2) Date: Jul. 11, 2016

(87) PCT Pub. No.: WO2015/107942
PCT Pub. Date: Jul. 23, 2015

(65) Prior Publication Data
US 2016/0330789 A1    Nov. 10, 2016

(30) Foreign Application Priority Data

Jan. 14, 2014   (JP) ................................ 2014-003852

(51) Int. Cl.
*H04W 8/00* (2009.01)
*H04W 40/24* (2009.01)
(Continued)

(52) U.S. Cl.
CPC ........... *H04W 8/005* (2013.01); *H04L 5/0048* (2013.01); *H04W 40/246* (2013.01);
(Continued)

(58) Field of Classification Search
CPC ............. H04W 72/04; H04W 72/0406; H04W 72/042; H04W 76/046; H04W 72/1226;
(Continued)

(56) References Cited

U.S. PATENT DOCUMENTS 9,532,362 B2   12/2016   Marinier et al.
9,716,540 B2   7/2017    Nagata et al.
(Continued)

FOREIGN PATENT DOCUMENTS

| WO | 2013/184613 A2 | 12/2013 |
| WO | 2013/184613 A3 | 12/2013 |
| WO | 2014/002943 A1 | 1/2014 |

OTHER PUBLICATIONS

Official Communication issued in International Patent Application No. PCT/JP2015/050189, dated Mar. 31, 2015.
(Continued)

*Primary Examiner* — Ashley Shivers
(74) *Attorney, Agent, or Firm* — Keating & Bennett, LLP

(57) ABSTRACT

There has been a problem that, when performing transmission of an SR or transmission of an RACH signal in a PUCCH in order for a terminal apparatus to request resource allocation for uplink use, the terminal apparatus transmits these signals to a pico base station apparatus in an Off-state. A base station apparatus which transmits a signal to the terminal apparatus by switching a first state in which a data signal is transmitted and a second state in which the data signal is not transmitted, includes a transmission state management unit for managing a state of the base station apparatus and a discovery signal generation unit for generating a discovery signal, in which the discovery signal is transmitted by changing a sequence generation method of a signal of the discovery signal generation unit based on
(Continued)

information of the first state or the second state held in the transmission state management unit.

8 Claims, 7 Drawing Sheets

(51) Int. Cl.
  *H04W 72/04* (2009.01)
  *H04W 76/27* (2018.01)
  *H04W 48/18* (2009.01)
  *H04L 5/00* (2006.01)
  *H04W 48/12* (2009.01)
  *H04W 48/20* (2009.01)
  *H04W 52/02* (2009.01)

(52) U.S. Cl.
  CPC ........... *H04W 48/12* (2013.01); *H04W 48/18* (2013.01); *H04W 48/20* (2013.01); *H04W 52/0206* (2013.01); *H04W 72/042* (2013.01); *H04W 76/27* (2018.02); *Y02D 70/1262* (2018.01); *Y02D 70/1264* (2018.01)

(58) Field of Classification Search
  CPC ..... H04W 76/10; H04W 76/11; H04W 76/27; H04W 8/005; H04W 40/27; H04W 40/246; H04L 2025/03783; H04L 27/261; H04L 27/2613; H04L 29/08648; H04L 29/08423; H04L 45/02; H04L 41/5058; H04L 67/16; H04L 67/1061; H04L 45/26; H04L 61/1541
  See application file for complete search history.

(56) References Cited

U.S. PATENT DOCUMENTS

| | | | |
|---|---|---|---|
| 9,801,207 B2 * | 10/2017 | Sergeyev | H04W 52/0216 |
| 2013/0322376 A1 | 12/2013 | Marinier et al. | |
| 2014/0022986 A1 * | 1/2014 | Wu | H04W 48/16 370/328 |
| 2014/0134993 A1 * | 5/2014 | Kwak | H04W 52/0206 455/418 |
| 2015/0189574 A1 * | 7/2015 | Ng | H04W 24/08 370/252 |
| 2015/0215022 A1 | 7/2015 | Nagata et al. | |
| 2016/0044611 A1 * | 2/2016 | Dai | H04W 52/146 370/329 |
| 2016/0142898 A1 * | 5/2016 | Poitau | H04W 76/14 370/329 |
| 2016/0150431 A1 * | 5/2016 | Zhang | H04W 48/16 370/252 |
| 2016/0157287 A1 * | 6/2016 | Chae | H04L 5/0023 370/329 |
| 2017/0238323 A1 | 8/2017 | Marinier et al. | |

OTHER PUBLICATIONS

Ericsson, "Semi-static small cell on/off operation", 3GPP TSG RAN WG1 Meeting #74 bis, R1-134658, Oct. 7-11, 2013, 4 pages.

NTT DOCOMO, "Details of Small Cell On/Off with Small Cell Discovery", 3GPP TSG RAN WG1 Meeting #75, R1-135514, Nov. 11-15, 2013, pp. 1-6.

3GPP TR 36.872 V12.1.0, "3rd Generation Partnership Project; Technical Specification Group Radio Access Network; Small Cell Enhancements for E-UTRA and E-UTRAN Physical layer aspects (Release 12)", Dec. 20, 2013, 100 pages.

Motorola Mobility, "Further Considerations on Small Cell On/Off"; 3GPP TSG RAN WG1; Meeting #75; R1-135676; Nov. 11-15, 2013; 3 pages.

ETRI; "Cell State Transition and Small Cell Discovery"; 3GPP TSG RAN WG1; Meeting #74bis; R1-134332; Oct. 7-11, 2014; pp. 1-4.

* cited by examiner

BASE STATION DEVICE AND TERMINAL DEVICE

TECHNICAL FIELD

The present invention relates to a base station apparatus and a terminal apparatus.

BACKGROUND ART

Standardization of the LTE (Long Term Evolution) system (Rel. 8 and Rel. 9), which is a wireless communication system for 3.9th generation mobile phones, has been completed, and the LTE-A (LTE-Advanced, also referred to as IMT-A, for example) system (after Rel. 10) as a more advanced version of the LTE system is now being standardized as one of 4th generation wireless communication systems.

In Rel. 12 of the LTE-A system, scenario of arranging a pico base station apparatus (also referred to as Pico eNB; evolved Node B, Small Cell, Low Power Node, or Remote Radio Head) having a small cell coverage has been studied. A terminal apparatus (user apparatus, UE, mobile station apparatus) connected to the pico base station apparatus is considered to be simultaneously connected to a macro base station apparatus having a large cell coverage or connected only to the pico base station apparatus.

It has been studied that, when pico base station apparatus are arranged densely, a state where a part of signals transmitted by a pico base station apparatus at all times is not sent (also referred to as an Off-state or a Dormant mode) is provided according to a traffic amount or the like from a viewpoint of a problem of interference imparted to other pico base station apparatuses and power consumption (refer to NPL 1). In the pico base station apparatus, by switching a state where data of the downlink is transferred (On-state) and the Off-state according to the traffic amount, it is possible to reduce influence of interference and increase system throughput. On the other hand, when a transition time between the On-state and the Off-state of the pico base station apparatus is long, it takes a long time to start communication of the terminal apparatus, so that there arises a problem that overhead in which the terminal apparatus is connected to the pico base station apparatus under an environment where the traffic amount changes drastically becomes large and an effect of improving the system throughput is reduced. Thus, a method for shortening time required until transmission and reception of data is allowed after the terminal apparatus is connected to the pico base station apparatus in the Off-state has been studied.

In a case where the terminal apparatus sets a serving cell (or CC: Component Carrier) formed by the macro base station apparatus as a primary cell, in order to perform connection with the pico base station apparatus, it is necessary to add the CC formed by the pico base station apparatus as a secondary cell or to perform handover to the CC formed by the pico base station apparatus. In this case, RRM (Radio Resource Management) measurement accounts for a large proportion of the overhead needed for the terminal apparatus to perform handover to the CC formed by the pico base station apparatus. Thus, it has been proposed to realize reduction in the overhead by enabling the RRM measurement also for the pico base station apparatus in the Off-state by the terminal apparatus, and one method thereof is to transmit a Discovery Signal (DS, also referred to as a DRS: Discovery Reference Signal) by the pico base station apparatus in the Off-state (refer to NPL 2). As a method for transmitting the discovery signal, it has been studied to use a part of REs (resource elements) used by a CRS (Cell-Specific Reference Signal), a CSI-RS (Channel State Information Reference Signal), and a PSS/SSS (Primary Synchronization Signal/Secondary Synchronization Signal), and it has been studied that the pico base station apparatus transmits the discovery signal in both of the Off-state and On-state.

CITATION LIST

Patent Literature

NPL 1: Ericsson, "Semi-static small cell on/off operation", R1-134658, Oct. 7-11, 2013

NPL 2: NTT DOCOMO, "Details of Small Cell On/Off with Small Cell Discovery", R1-135514, Nov. 11-15, 2013

SUMMARY OF INVENTION

Technical Problem

When the pico base station apparatus transmits the discovery signal regardless of being in the Off-state or the On-state, the terminal apparatus is difficult to grasp a state of the pico base station apparatus. In this case, there is a problem that, when performing transmission of an SR (Scheduling Request) or transmission of an RACH (Random Access CHannel) signal in a PUCCH (Physical Uplink Control CHannel) in order for the terminal apparatus to request resource allocation (UL grant) for uplink use, the terminal apparatus transmits these signals to a pico base station apparatus in the Off-state. As a result, since the pico base station apparatus in the Off-state requires a longer transition time from the Off-state to the On-state compared to a case where the terminal apparatus transmits the SR or the RACH signal to the pico base station apparatus in the On-state, the overhead required for the terminal apparatus to receive UL grant increases. In a case where the traffic amount is small, when the pico base station apparatus is caused to make a transition from the Off-state to the On-state with the SR or the RACH signal transmitted by the terminal apparatus, a problem of imparting interference is caused.

The invention has been made in view of the aforementioned points, and allows a terminal apparatus to grasp a state of a pico base station apparatus by switching a method for transmitting a discovery signal by the pico base station apparatus according to the state.

Solution to Problem (1) The invention has been made in order to solve the aforementioned problem, and one aspect of the invention is a base station apparatus which transmits a signal to a terminal apparatus by switching a first state in which a data signal is transmitted and a second state in which the data signal is not transmitted, including: a transmission state management unit for managing a state of the base station apparatus; and a discovery signal generation unit for generating a discovery signal, in which the discovery signal is transmitted by changing a sequence generation method of a signal of the discovery signal generation unit based on information of the first state or the second state held in the transmission state management unit.

(2) Moreover, in one aspect of the invention, the sequence used for the discovery signal generated by the discovery signal generation unit changes a root sequence index of a Zadoff-Chu sequence or an initial value of a Gold sequence.

(3) Moreover, in one aspect of the invention, the sequence used for the discovery signal generated by the discovery signal generation unit changes a Zadoff-Chu sequence and a Gold sequence.

(4) Moreover, one aspect of the invention includes a discovery signal multiplexing unit for allocating the discovery signal to an RE, in which the discovery signal multiplexing unit performs allocation to a similar resource in the first state and the second state.

(5) Moreover, in one aspect of the invention, the discovery signal generation unit switches the number of antenna ports used for transmission of the discovery signal based on information about an antenna port in the second state, which is notified from the base station apparatus.

(6) Moreover, in one aspect of the invention, the information about the antenna port in the second state, which is notified from the base station apparatus, includes the number of antenna ports or an antenna port number.

(7) Moreover, in one aspect of the invention, the information about the antenna port in the second state, which is notified from the base station apparatus, includes information of an RE used by each antenna port.

(8) Moreover, in one aspect of the invention, the discovery signal generation unit changes a cycle at which the discovery signal is transmitted.

(9) Moreover, in one aspect of the invention, the discovery signal generation unit changes a configuration of a sub-frame for transmitting the discovery signal.

(10) Moreover, in one aspect of the invention, the discovery signal generation unit generates, in a case where the base station apparatus is in the first state, a sequence of a CRS based on a cell ID, and generates, in a case where the base station apparatus is in the second state, a sequence based on an ID of the second state associated with the cell ID.

(11) Moreover, in one aspect of the invention, the discovery signal generation unit generates, in a case where the base station apparatus is in the first state, a sequence of a CSI-RS based on a cell ID, and generates, in a case where the base station apparatus is in the second state, a sequence based on an ID of the second state associated with the cell ID.

(12) Moreover, in one aspect of the invention, the discovery signal generation unit generates, in a case where the base station apparatus is in the first state, sequences of a PSS and an SSS based on a cell ID, and generates, in a case where the base station apparatus is in the second state, a sequence based on an ID of the second state associated with the cell ID.

(13) Moreover, one aspect of the invention includes a DL signal generation unit for generating a DL signal, in which the DL signal generation unit generates an ID of the first state that is associated with a physical ID of the first state.

(14) Moreover, one aspect of the invention is a terminal apparatus which receives a signal transmitted by a base station apparatus which switches a first state in which a data signal is transmitted and a second state in which the data signal is not transmitted, including: a discovery signal detection unit for detecting a discovery signal transmitted by the base station apparatus; and a base station apparatus state identification unit for identifying a state of the base station apparatus by the detected discovery signal, in which the discovery signal detection unit detects at least one piece of information of a signal sequence, the number of antenna ports, an antenna port number, and a resource which are used for transmission of the discovery signal, and the base station apparatus state identification unit identifies the state of the base station apparatus by the information detected by the discovery signal detection unit.

Advantageous Effects of Invention

According to the invention, since the terminal apparatus is able to grasp the state of the pico base station apparatus, it is possible to reduce the overhead required for data transmission of the uplink. Further, when the traffic amount is small, the pico base station apparatus is less likely to make a transition to a state where data transmission of the downlink is performed and interference is reduced, so that the system throughput is improved.

DESCRIPTION OF EMBODIMENTS (First Embodiment)

Figure 1:
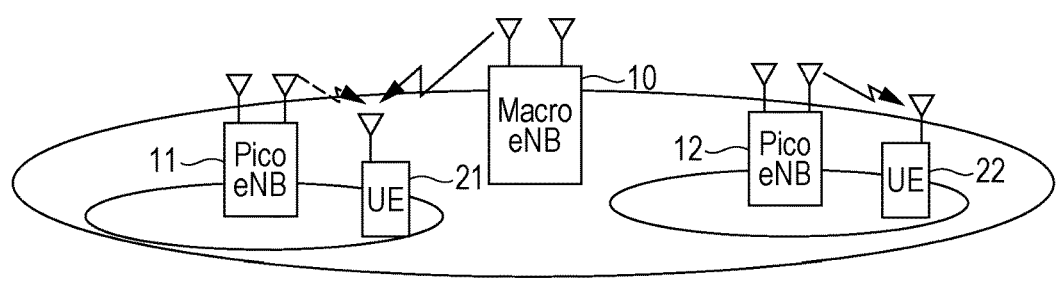
FIG. 1 illustrates one example of a configuration of a system according to the invention.

An embodiment will be described below with reference to drawings. FIG. 1 illustrates one example of a configuration of a system according to the invention. This system is constituted by a macro base station apparatus 10, pico base station apparatuses 11 and 12, and terminal apparatuses 21 and 22. Note that, the number of the terminal apparatuses is not limited to two, and the number of antennas of each of the apparatuses may be one or more. The number of antennas of each of the pico base station apparatuses 11 and 12 which perform transmission with less power than that of the macro base station apparatus 10 may be one or more. The pico base station apparatus 11 in the same figure is in a state of not transmitting a data signal of the downlink (an Off-state, also referred to as a transmission mode or a dormant mode) and the pico base station apparatus 12 is in a state of performing data transmission of the downlink (On-state). Here, the pico base station apparatus 11 in the Off-state is in a mode in which transmission by a PDSCH (Physical Downlink Shared CHannel), a PDCCH (Physical Downlink Control CHannel), or an EPDCCH (Enhanced PDCCH) is not performed, but a condition under which not only the aforementioned signal but also other signals are not transmitted may be provided. The pico base station apparatus 11 in the Off-state does not perform data transmission of the downlink to the terminal apparatus, but transmits a discovery signal (DS, also referred to as a DRS: Discovery Reference signal), so that the terminal apparatus is able to make RRM (Radio Resource Management) measurement.

The terminal apparatus 21 is connected to the macro base station apparatus 10, and is allowed to receive the discovery signal transmitted from the pico base station apparatus 11. On the other hand, the terminal apparatus 22 is connected to the pico base station apparatus 12 in the On-state. In this case, when the terminal apparatus 21 performs data transmission of the uplink, the terminal apparatus 21 transmits an SR (Scheduling Request) or an RACH (Random Access Channel) signal in order to request resource allocation (UL grant) of the uplink. Here, the terminal apparatus 21 discriminates the state of the pico base station apparatus 11 by the discovery signal received from the pico base station apparatus 11, and determines a base station apparatus, to which a UL grant request is made, based on information of the state, received power of the signal of the downlink of the macro base station apparatus 10 and the pico base station apparatus 11, and the like.

Figure 2:
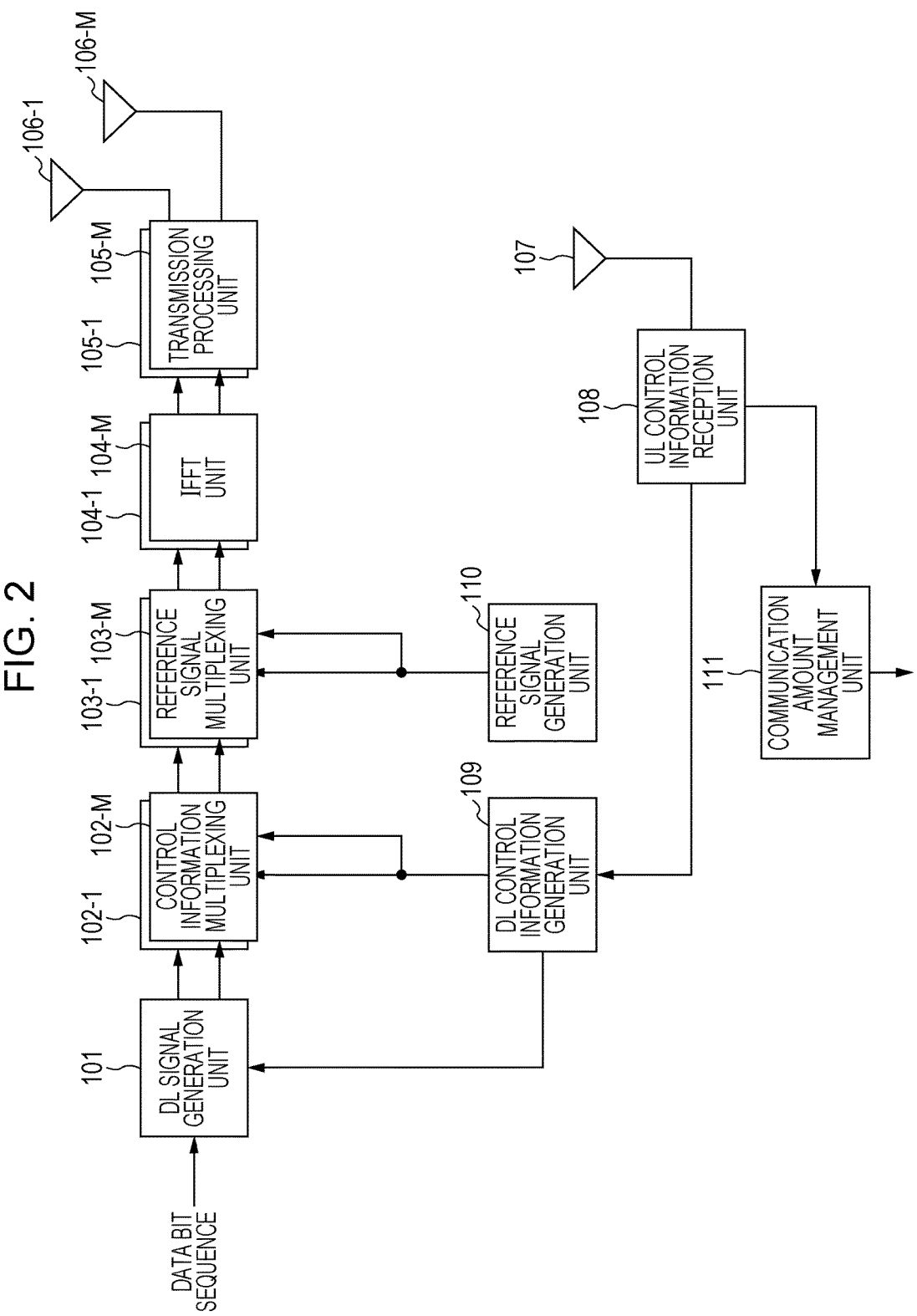
FIG. 2 illustrates one example of a configuration of a macro base station apparatus 10 according to the invention.

FIG. 2 illustrates one example of a configuration of the macro base station apparatus 10 according to the invention. Minimum blocks needed for the invention are illustrated. The macro base station apparatus 10 receives, with a receive antenna 107, control information transmitted by a PUCCH (Physical Uplink Control CHannel) or control information transmitted by a PUSCH (Physical Uplink Shared CHannel) from the terminal apparatus. A UL control information reception unit 108 down-converts a received signal into a baseband frequency, and performs A/D (Analog/Digital) conversion to convert it into a signal obtained by removing CP (Cyclic Prefix) from a digital signal. Then, the UL control information reception unit 108 extracts CSI (Channel State Information), an SR, ACK/NACK (Acknowledgement/Negative Acknowledgement), an RACH signal, or the like from the control information from which the CP has been removed. The control information after the extraction is input to a DL control information generation unit 109, and information about resource allocation of the uplink and the downlink is input to a communication amount management unit 111 at a next transmission opportunity of the SR, the RACH signal, the ACK/NACK, or the like. The communication amount management unit 111 monitors the traffic amount of the uplink and the downlink, and when the traffic amount increases, determines a transition of the pico base station apparatus in the Off-state to the On-state, and gives a transition instruction to the pico base station apparatus. When the traffic amount decreases, the communication amount management unit 111 determines a transition of a part of the pico base station apparatus in the On-state to the Off-state and gives a transition instruction to the pico base station apparatuses.

The DL control information generation unit 109 determines a parameter used for resource allocation for data transmission and transmission of the downlink or the uplink, and converts it to a format called a DCI (Downlink Control Information) format. As the DCI format used for the uplink, there are a format 0 in a single antenna mode, a format 4 of MIMO (Multiple-Input Multiple-Output) multiplexed transmission, and the like. As the DCI format used for the downlink, there are formats 1 and 1A to 1D, formats 2 and 2A to 2D, and the like. In addition, the resource allocation and the transmission parameter for data transmission of the downlink are determined based on the CSI, the ACK/NACK, and the like. The DL control information generation unit 109 outputs the transmission parameter of the downlink to the DL signal generation unit 101 and outputs DL control information, to be transmitted to the terminal apparatus, to control information multiplexing units 102-1 to 102-M.

Figure 3:
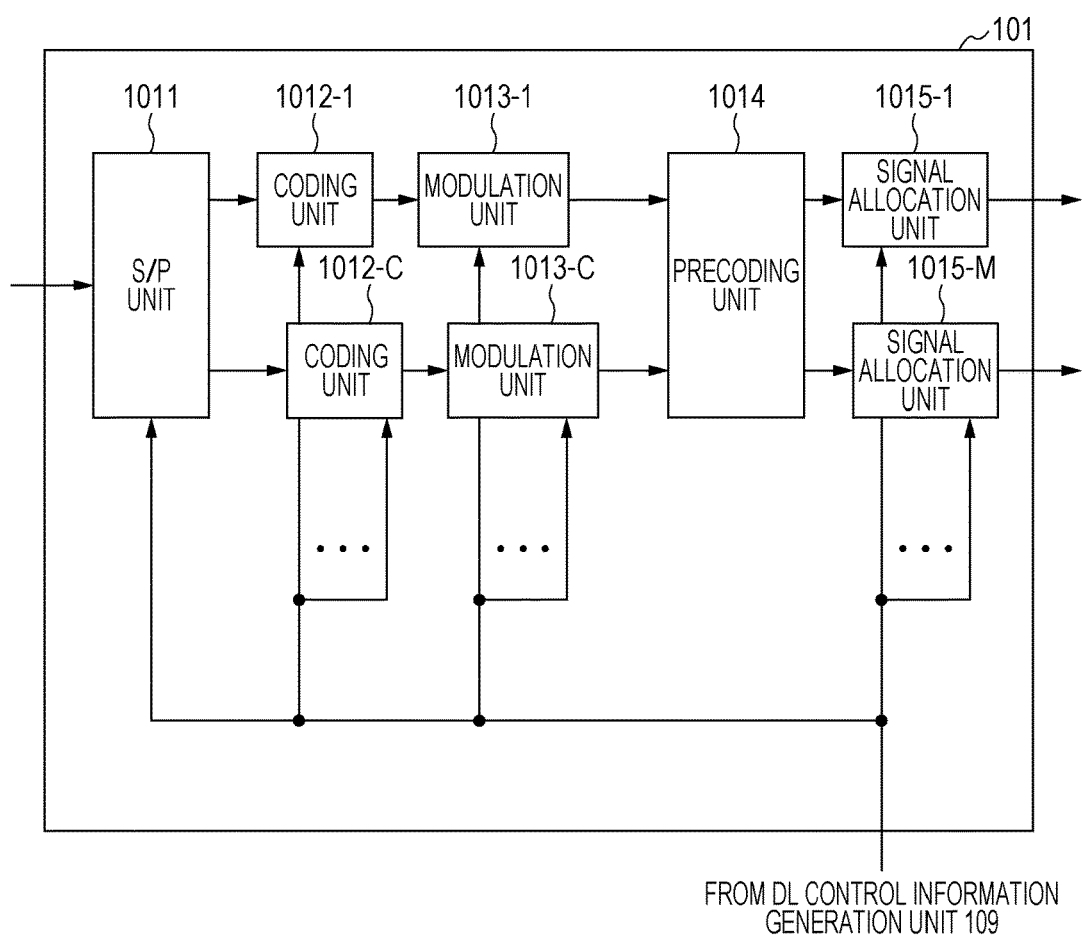
FIG. 3 illustrates one example of a configuration of a DL signal generation unit 101 according to the invention.

FIG. 3 illustrates one example of a configuration of the DL signal generation unit 101 according to the invention. In the DL signal generation unit 101, a data bit sequence is input to an S/P unit 1011. The ACK/NACK of a previous transmission opportunity is input from the DL control information generation unit 109 to the S/P unit 1011, and when the ACK is input, the S/P unit 1011 divides a new data bit sequence into the number of transmission streams. When the NACK is input, the S/P unit 1011 divides a data bit sequence transmitted at the previous transmission opportunity into the number of transmission streams. The divided data bit sequences are input to coding units 1012-1 to 1012-C. The coding units 1012-1 to 1012-C apply coding of an error correction code to the input data bit sequences. For the error correction code, for example, a turbo code, an LDPC (Low Density Parity Check) code, a convolutional code, or the like is used. A type of the error correction code applied by the coding units 1012-1 to 1012-C may be determined in advance by a transmission and reception apparatus or may be notified as control information at each transmission and reception opportunity. The coding units 1012-1 to 1012-C perform puncturing for the coded bit sequences based on a coding rate included in MCS (Modulation and Coding Scheme) input from the DL control information generation unit 109. The coding units 1012-1 to 1012-C output the coded bit sequences subjected to the puncturing to modulation units 1013-1 to 1013-C.

Information of a modulation scheme is input to the modulation units 1013-1 to 1013-C, and the modulation units 1013-1 to 1013-C applies modulation to the coded bit sequences input from the coding units 1012-1 to 1012-C to thereby generate modulation symbol sequences. Examples of the modulation scheme include QPSK (Quaternary Phase Shift Keying), 16-QAM (16-ary Quadrature Amplitude Modulation), and 64-QAM. The modulation units 1013-1 to 1013-C output the generated modulation symbol sequences to a precoding unit 1014. The precoding unit 1014 multiplies each of the input modulation symbol sequences by a precoding matrix and generates signals of each antenna port to output them to signal allocation units 1015-1 to 1015-M. Here, the precoding matrix is determined by the DL control information generation unit 109 which is not illustrated and input to the precoding unit 1014. As to the antenna ports, in a case of a configuration where a plurality of antennas are able to be physically regarded as the same, the number of the antenna ports is set as 1. To the signal allocation units 1015-1 to 1015-M, resource allocation information is input from the DL control information generation unit 109 and signal sequences are input from the precoding unit 1014. The signal allocation units 1015-1 to 1015-M allocate and output the signal sequences to a resource used for the downlink. Here, the resource is set as a RB (Resource Block) formed of twelve sub-carriers and one sub-frame or a RBG (Resource Block Group) which is a group of a plurality of RBs. In the downlink, one or more RBs or the RBG is used.

The DCI format transmitted by the PDCC or the EPDCCH is input from the DL control information generation unit 109 to control information multiplexing units 102-1 to 102-M, and the control information multiplexing units 102-1 to 102-M multiplexes it with a data signal input from the DL signal generation unit 101. The signal sequence of a CRS (Cell-specific Reference Signal), a CSI-RS (Channel State Information-Reference Signal), and/or a DMRS (De-Modulation Reference Signal) is input from the reference signal generation unit 110 to reference signal multiplexing units 103-1 to 103-M, and the reference signal multiplexing units 103-1 to 103-M multiplex it with the signal sequence in which the data signal and the control information are multiplexed. IFFT units 104-1 to 104-M perform IFFT (Inverse Fast Fourier Transform) of the signal sequence to transform from a frequency domain signal sequence into a time domain signal sequence. Transmission processing units 105-1 to 105-M insert the CP to the time domain signal sequence, converts it into an analog signal by D/A (Digital/Analog) conversion, and up-converts the converted signal into a radio frequency used for transmission. The transmission processing units 105-1 to 105-M amplify the up-converted signal with a PA (Power Amplifier), and transmit the amplified signal through transmit antennas 106-1 to 106-M. As described above, an OFDM (Orthogonal Frequency Division Multiplexing) signal is transmitted to the terminal apparatus in the downlink.

Figure 4:
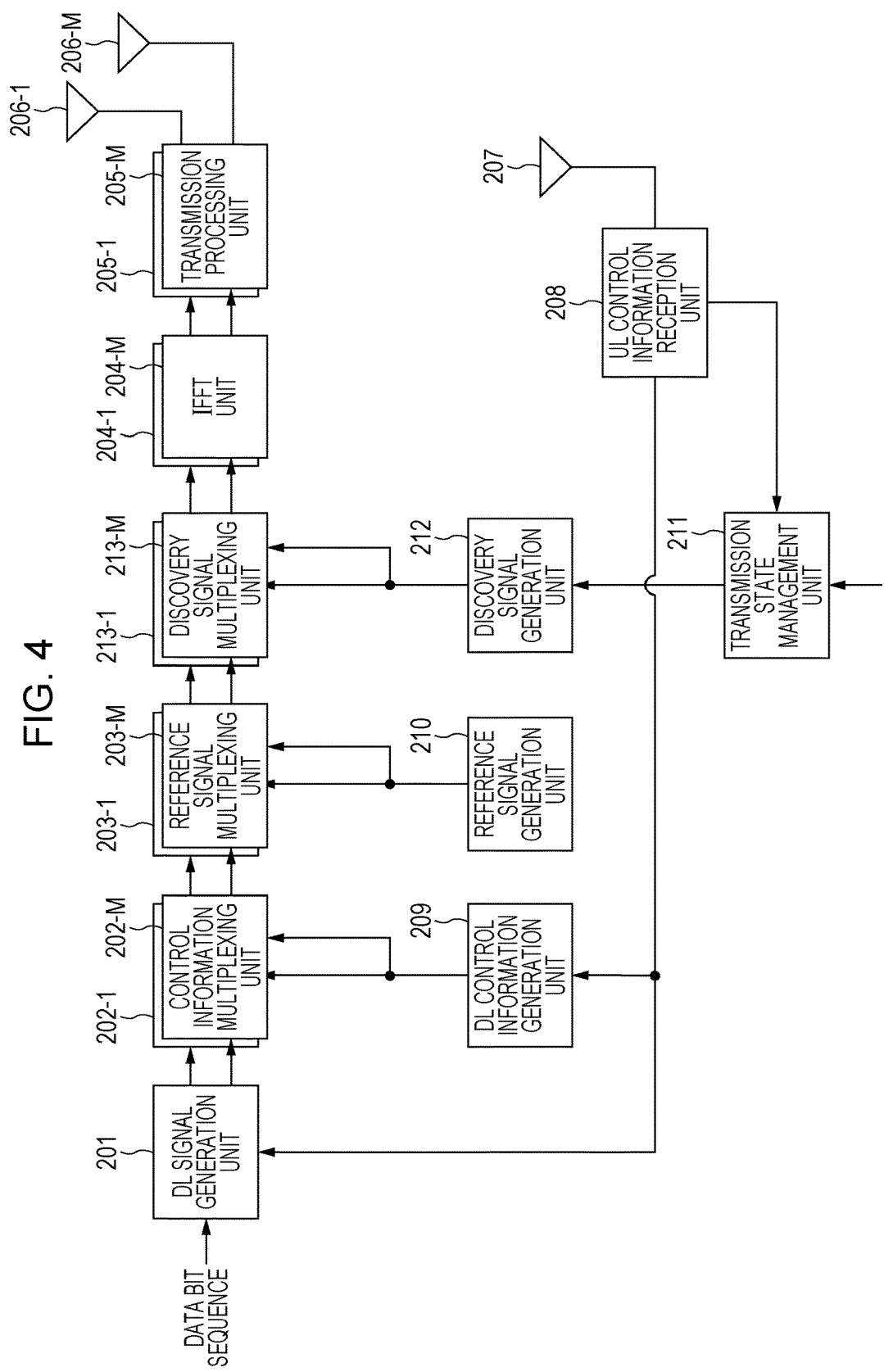
FIG. 4 illustrates one example of a configuration of a pico base station apparatus 11 according to the invention.

FIG. 4 illustrates one example of a configuration of the pico base station apparatus 11 according to the invention. The pico base station apparatus 12 also has a similar configuration. Since the pico base station apparatus 11 transmits the OFDM signal in the downlink similarly to the macro base station apparatus 10, processings from a DL signal generation unit 201 up to reference signal multiplexing units 203-1 to 203-M is respectively similar to the processings from the DL signal generation unit 101 up to the reference signal multiplexing units 103-1 to 103-M in FIG. 2, and those descriptions thereof will be omitted. In addition, processings of IFFT units 204-1 to 204-M, transmission processing units 205-1 to 205-M, a DL control information generation unit 209, and a reference signal generation unit 210 are also respectively similar to the processings of the IFFT units 104-1 to 104-M, the transmission processing units 105-1 to 105-M, the DL control information generation unit 109, and the reference signal generation unit 110 in FIG. 2, and those descriptions thereof will be omitted.

In the pico base station apparatus 11 of FIG. 4, control information transmitted by the PUCCH or the PUSCH from the terminal apparatus is received by a receive antenna 207. A UL control information reception unit 208 down-converts a received signal to a baseband frequency for A/D conversion to convert it into the signal obtained by removing the CP from the digital signal. Then, the UL control information reception unit 208 extracts CSI, an SR, ACK/NACK, an RACH signal, or the like from the control information from which the CP has been removed. The control information after the extraction is input to the DL control information generation unit 209, and information for requesting resource allocation of the SR, the RACH signal, or the like is input to a transmission state management unit 211. The transmission state management unit 211 performs state management, and stores the states of the Off-state and On-state therein. In the case of the Off-state, when detecting an increase in the traffic amount in the communication amount management unit 111 of the macro base station apparatus 10, the transmission state management unit 211 receives a transition instruction to the On-state, and performs state transition processing. Moreover, in the case of the Off-state, when the request of resource allocation is input from the DL control information generation unit 209, the transmission state management unit 211 performs state transition processing to the On-state. On the other hand, in the case of the On-state, when detecting a decrease in the traffic amount in the communication amount management unit 111 of the macro base station apparatus 10, the transmission state management unit 211 receives a transition instruction to the Off-state and performs state transition processing. Moreover, in the case of the On-state, when there is neither control information nor data transmitted by the pico base station apparatus, the transmission state management unit 211 may perform state transition processing to the Off-state. The transmission state management unit 211 outputs state information of whether to be the On-state or the Off-state to a discovery signal generation unit 212.

The state information of whether to be the On-state or the Off-state is input from the transmission state management unit 211 to the discovery signal generation unit 212. The discovery signal generation unit 212 generates a discovery signal $D_{l,ns,m}$ with a sequence of the following formula.

[Expression 1]

$$D_{l,ns,m} = \frac{1}{\sqrt{2}}(1 - 2c(2m)) + j\frac{1}{\sqrt{2}}(1 - 2c(2m + 1)) \quad \text{formula (1)}$$

In the formula, 1 denotes an OFDM symbol number in a slot, and ns denotes a slot number in a frame. A pseudo-random sequence c(n) is a Gold sequence having a length of 31 and is defined by the following formula.

[Expression 2]

$$c(n) = (x_1(n+N_c) + x_2(n+N_c)) \bmod 2 \quad \text{formula (2)}$$

In the formula, $N_c$=1600, A mod 2 is a remainder obtained by dividing A by 2, and $x_1(i)$ and $x_2(i)$ are respectively defined by the following formulas.

[Expression 3]

$$x_1(i+31) = (x_1(i+3) + x_1(i)) \bmod 2 \quad \text{formula (3)}$$

[Expression 4]

$$x_2(i+31) = (x_2(i+3) + x_2(i+2) + x_2(i+1) + x_2(n)) \bmod 2 \quad \text{formula (4)}$$

In the formulas, $x_1(i)$ is 0 when n=0 to 30, and $C_{init}$ which is an initial value of $x_2(i)$ is determined by the state information indicating whether the pico base station apparatus is in the On-state or in the Off-state. First, when the pico base station apparatus is in the On-state, the following formula is used.

[Expression 5]

$$c_{init} = 2^{10}(7(n_s+1)+l+1)(2N_{cell\_id}+1)+2N_{cell\_id}+N_{CP} \quad \text{formula (5)}$$

In the formula, $N_{cell\_id}$ denotes a physical cell ID (or a virtual cell ID), and $N_{CP}$ is 1 in a frame structure of normal CP and 0 in a frame structure of extended CP. In this manner, the pico base station apparatus in the On-state transmits the discovery signal by the processing similar to that of the signal of the CRS.

Next, when the pico base station apparatus is in the Off-state, a different sequence is used for the discovery signal. As one example of using the different sequence, $N_{off\_id}$ is used instead of $N_{cell\_id}$ used for calculation of $C_{init}$ of the formula (5). Here, $N_{off\_id}$ is notified by RRC (Radio Resource Control) or the like to the terminal apparatus in advance, and is a value which is used for generating the sequence of the discovery signal by the pico base station apparatus in the Off-state. Values different for each base station apparatus may be used for $N_{off\_id}$, or a common value for each base station apparatus may be used for $N_{off\_id}$. Information of the RRC, whose signal is generated by the DL signal generation unit 201 similarly to the data bit sequence, is transmitted by processing similar to that of data. In addition, $N_{off\_id}$ may not be transmitted by the pico base station apparatus but may be transmitted by the macro base station apparatus, and in such a case, the signal is generated by the DL signal generation unit 101 and transmitted by processing similar to that of data. Further, when $N_{off\_id}$ of each base station apparatus is notified to the terminal apparatus, $N_{cell\_id}$ used when the macro base station apparatus or the pico base station apparatus is in the On-state and $N_{off\_id}$ used when it is in the Off-state may be notified in association with each other so that the terminal apparatus is able to grasp an association relation between $N_{off\_id}$ and $N_{cell\_id}$ of the same base station apparatus. The sequence of the discovery signal transmitted by the pico base station apparatus in the Off-state has the initial value changed in the example of the present embodiment, but without limitation to this example, it may be differentiated from the sequence of the discovery signal transmitted by the pico base station apparatus in the On-state by using a different generation method for generating the sequence from the formula (2) to the formula (4) or may be changed to the sequence of the PSS, the SSS, or the CSI-RS.

The discovery signal generation unit 212 inputs the generated discovery signal to discovery signal multiplexing units 213-1 to 213-M. The discovery signal multiplexing units 213-1 to 213-M multiplex it with other transmission signals. The resource (RE: Resource Element) to be multiplexed with the discovery signal is arranged in a k-th sub-carrier and an l-th OFDM symbol. k and l are respectively defined by the following formulas.

[Expression 6]

$$k = 6m + (v + v_{shift}) \bmod 6 \quad \text{formula (6)}$$

[Expression 7]

$$l = \begin{cases} 0, N_{DL\_symb} - 3 & \text{if } p \in \{0,1\} \\ 1 & \text{if } p \in \{2,3\} \end{cases} \quad \text{formula (7)}$$

In the formula, $v_{shift}$ is generated based on $N_{cell\_id}$ in the case of the pico base station apparatus in the On-state. In the case of the pico base station apparatus in the Off-state, $v_{shift}$ is generated based on $N_{cell\_id}$ because a resource similar to that in the case of the On-state is used. However, a frequency position of the discovery signal of the pico base station apparatus in the Off-state may be changed and $N_{off\_id}$ may be used for $v_{shift}$. m denotes a RB index, $N_{DL\_symb}$ denotes the number of OFDM symbols in a slot of the downlink, and v is defined by the following formula.

[Expression 8]

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(\text{ns} \bmod 2) & \text{if } p = 3 \\ 3 + 3(\text{ns} \bmod 2) & \text{if } p = 3 \end{cases} \quad \text{formula (8)}$$

Here, when the pico base station apparatus is in the Off-state, only the discovery signal without any other signals may be transmitted. In the subsequent processing, the signal is transmitted in a similar manner to that of the macro base station apparatus 10.

In the example of the present embodiment, the sequence of the discovery signal is changed by switching $N_{cell\_id}$ and $N_{off\_id}$ notified to the terminal apparatus according to whether the pico base station apparatus is in the On-state or the Off-state. However, the invention is not limited to this example, and $N_{off\_id}$ may not be notified to the terminal apparatus but may be determined uniquely based on $N_{cell\_id}$. For example, a term of $N_{state}$ may be added to the formula (5) and the value is obtained in such a manner that $N_{state} = 0$ when the pico base station apparatus is in the On-state and $N_{state}$ is non-zero when the pico base station apparatus is in the Off-state. Note that, without limitation to such an example, $N_{off\_id}$ may be calculated based on $N_{cell\_id}$. For example, it may be set that $N_{off\_id} = 503 - N_{cell\_id}$ or another calculation method may be used.

Figure 5:
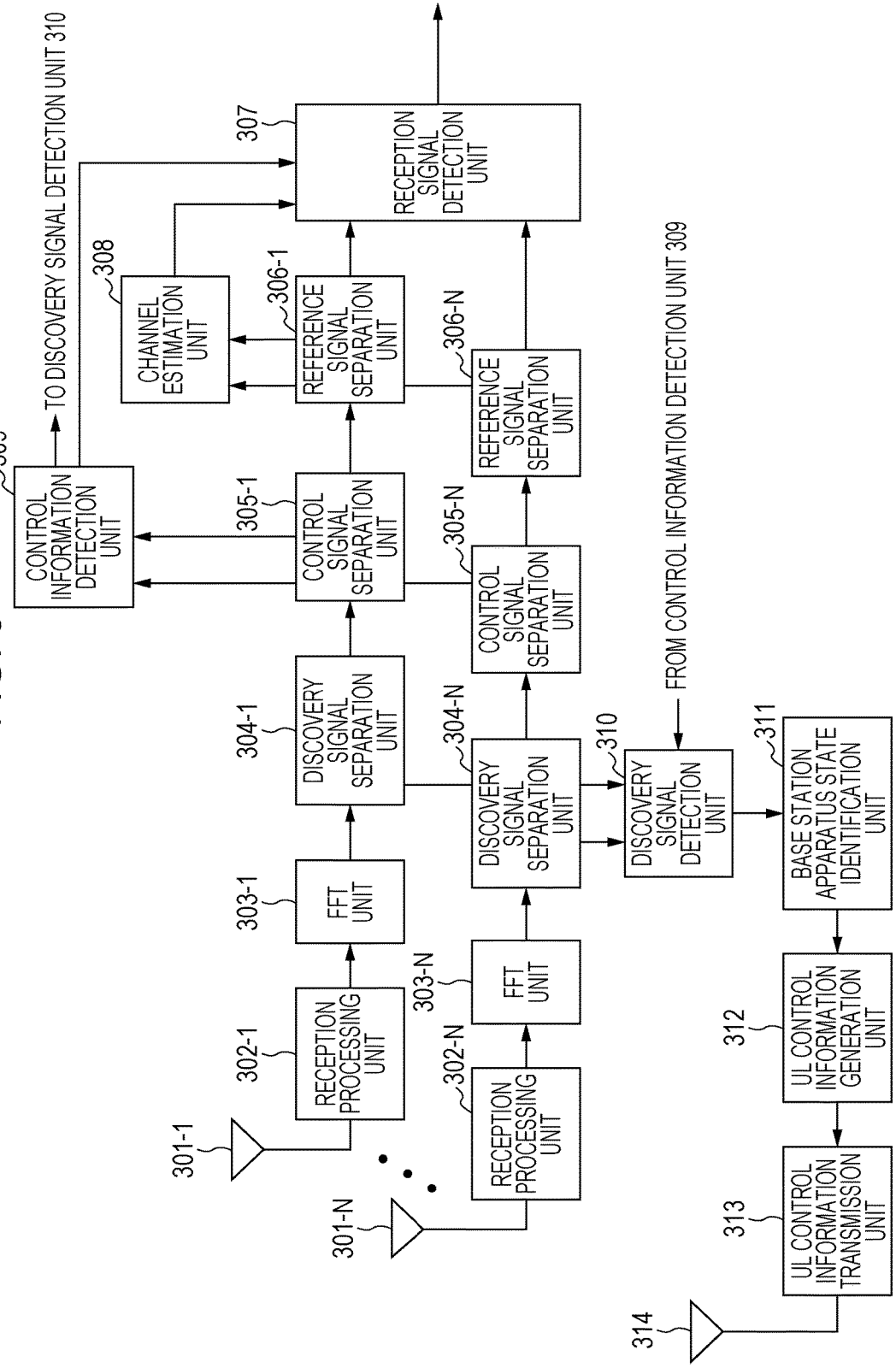
FIG. 5 illustrates one example of a configuration of a terminal apparatus according to the invention.

FIG. 5 illustrates one example of a configuration of the terminal apparatus according to the invention. Reception is performed by receive antennas 301-1 to 301-N. N is an integer of 1 or more. Reception processing units 302-1 to 302-N down-converts a received signal to a baseband frequency, and performs A/D conversion to the down-converted signal to thereby generate a digital signal. Further, the reception processing units 302-1 to 302-N input a signal obtained by removing CP from the digital signal to FFT units 303-1 to 303-N. The FFT units 303-1 to 303-N transform a received signal sequence, which is input, from a time domain signal sequence into a frequency domain signal sequence by Fast Fourier Transform and input the frequency domain signal sequence to discovery signal separation units 304-1 to 304-N. The discovery signal separation units 304-1 to 304-N perform separation into the discovery signal and other signals and input each of them to a discovery signal detection unit 310 and control signal separation units 305-1 to 305-N. Here, in the present embodiment, the RE used for transmission of the discovery signal is calculated by the formula (6) to the formula (8) and a value of $v_{shift}$ is the same whether the pico base station apparatus is in the On-state or the Off-state. The discovery signal separation units 304-1 to 304-N perform separation of the discovery signal and inputs the resultant to the discovery signal detection unit 310. When different values are used between the On-state and the Off-state of the pico base station apparatus and $N_{cell\_id}$ and $N_{off\_id}$ are respectively used, however, REs to be extracted are different from each other. In this case, the discovery signal separation units 304-1 to 304-N separate both signals of the REs used in the On-state and the Off-state of the pico base station apparatus and input them to the discovery signal detection unit 310. In addition, it is set that $N_{off\_id}$ used for calculation of the REs is input in advance by the control information detection unit 309.

The control signal separation units 305-1 to 305-N separate the signal transmitted by the PDCCH or the EPDCCH and input the resultant to the control information detection unit 309. Also when receiving the signal of the RRC, the control signal separation units 305-1 to 305-N separate it and input the resultant to the control information detection unit 309. By blind decoding, the control information detection unit 309 detects the DCI format addressed to the terminal apparatus, which is transmitted by the PDCCH or the EPDCCH. The control information detection unit 309 detects the signal of the RRC. The control information detection unit 309 inputs detected control information to a reception signal detection unit 307. In a case where the control information detection unit 309 receives, by the RRC, information used for generating the sequence of the discovery signal when the pico base station apparatus is in the Off-state, the control information detection unit 309 inputs it to the discovery signal detection unit 310. In one example of the present embodiment, description will be given for a case where information used for generating the sequence of the discovery signal is $N_{off\_id}$, and $N_{cell\_id}$ and $N_{off\_id}$ are associated with each other.

Reference signal separation units 306-1 to 306-N separate the input signal into a reference signal and a data signal and input each of them to a channel estimation unit 308 and the reception signal detection unit 307. The CRS, the CSI-RS, or the DMRS that is the reference signal transmitted being multiplexed with the data signal is input to the channel estimation unit 308, and the channel estimation unit 308 inputs an estimated frequency response for demodulation to the reception signal detection unit 307. The channel estimation unit 308 inputs channel information estimated by the CRS or the CSI-RS to a UL control information generation unit 312, which is not illustrated, in order to use it for transmission of the cyclic or acyclic CSI.

Figure 6:
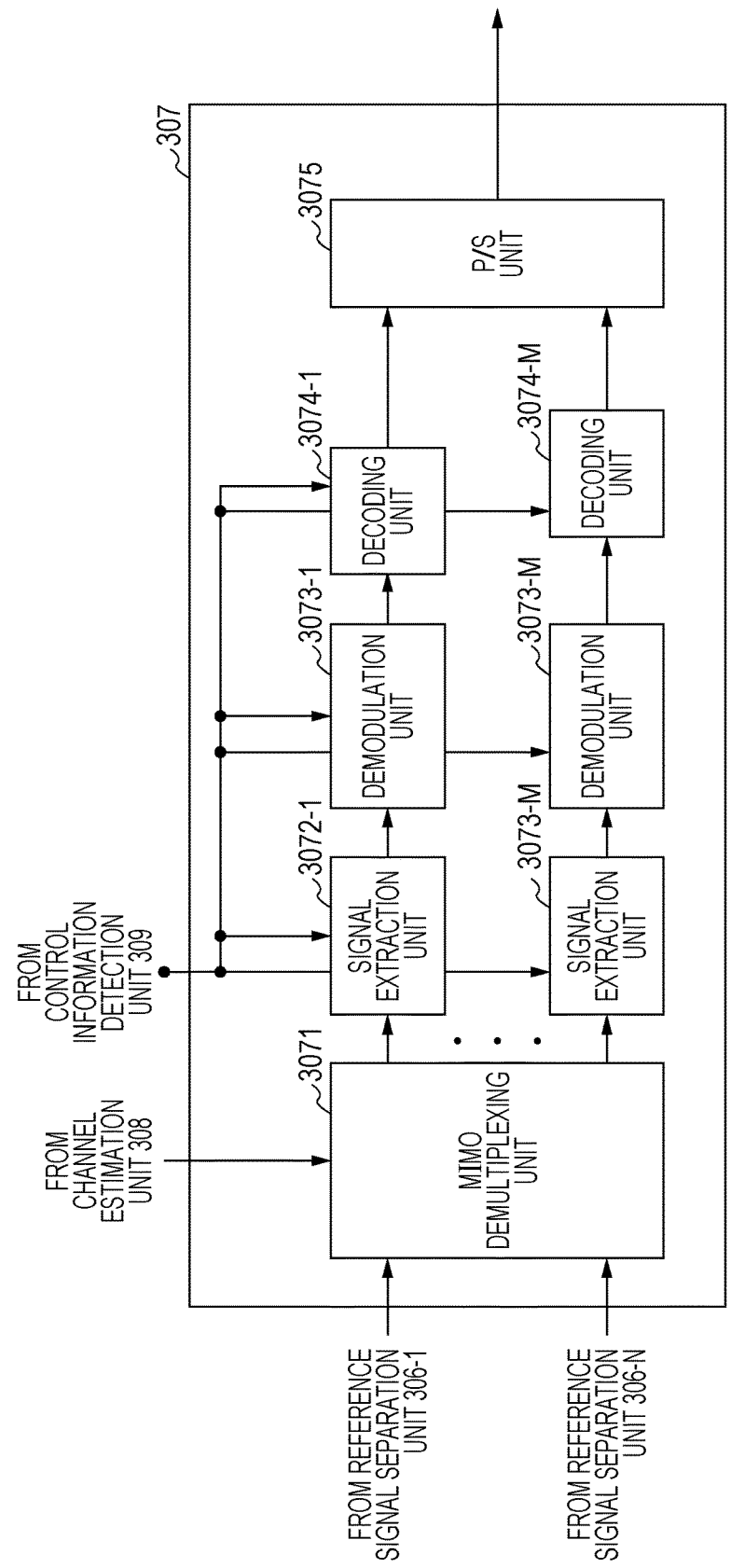
FIG. 6 illustrates one example of a configuration of a reception signal detection unit 307 according to the invention.

FIG. 6 illustrates one example of a configuration of the reception signal detection unit 307 according to the invention. In the reception signal detection unit 307, the data signal received from the reference signal separation units 306-1 to 306-N is input to a MIMO demultiplexing unit 3071 and an estimation value of the frequency response is input from the channel estimation unit 308. The MIMO demultiplexing unit 3071 generates equalization weight based on a MMSE (Minimum Mean Square Error) criterion by the input frequency response of the channel and multiplies the input data signal sequence of the frequency domain by the weight to thereby demultiplex the signal subjected to MIMO multiplexing. The MIMO demultiplexing unit 3071 input the demultiplexed signal sequence to signal extraction units 3072-1 to 3072-M. Here, M is an integer of 1 or more. To signal processing at the MIMO demultiplexing unit 3071, other detection methods such as spatial filtering with other criteria such as a ZF (Zero Forcing) criterion, or MLD (Maximum Likelihood Detection) may be applied.

Resource allocation information used for data transmission of the downlink is input from the control information detection unit 309 to the signal extraction units 3072-1 to 3072-M, and the signal extraction units 3072-1 to 3072-M extract the data signal from the received signal. Information of a modulation scheme is input from the control information detection unit 309 to the demodulation units 3073-1 to 3073-M, and the demodulation units 3073-1 to 3073-M apply demodulation processing to a reception signal sequence of a time domain to obtain an LLR (Log Likelihood Ratio) of a bit sequence, that is, an LLR sequence. Information of a coding rate is input from the control information detection unit 309 to decoding units 3074-1 to 3074-M, and the decoding units 3074-1 to 3074-M perform decoding processing to the LLR sequence. The decoding units 3074-1 to 3074-M make a hard decision of the decoded LLR sequence, and when there is no error by cyclic redundancy check (CRC), inputs the bit sequence to a P/S unit 3075 as transmission data. The P/S unit 3075 combines and outputs a plurality of pieces of transmission data. Note that, though description has been given in the present embodiment for a case where the number of spatial multiplexing M and the number of decoding units match, the number of spatial multiplexing M and the number of decoding units (that is, the number of codewords) may be different from each other similarly to the LTE. The P/S unit 3075 inputs presence/absence of an error in received data to the UL control information generation unit 312 which is not illustrated. This information is used for transmission of the ACK/NACK.

On the other hand, based on the discovery signal transmitted from the pico base station apparatus, the discovery signal detection unit 310 detects the pico base station apparatus and checks a state of the pico base station apparatus. The discovery signal detection unit 310 performs a detection of the discovery signal by assuming that sequences of the discovery signals are transmitted by the pico base station apparatus either in the On-state or in the Off-state. Specifically, by taking a correlation between the sequence generated with the formulas (2) to (5) by using $N_{cell\_id}$ and the sequence generated by $N_{off\_id}$ associated with $N_{cell\_id}$, which one of the transmitted sequences is judged, or the like. $N_{off\_id}$ is input in advance from the control information detection unit 309 to the discovery signal detection unit 310. When a correlation value is less than a predetermined value with respect to both of the sequences, the terminal apparatus may judge that no pico base station apparatus allowing connection exists. In addition, the discovery signal detection unit 310 measures reception quality for a plurality of frames or sub-frames by discovery signals transmitted with the use of the same sequence and performs RRM measurement. The discovery signal detection unit 310 inputs information of the sequences of the discovery signals transmitted by the pico base station apparatus in the On-state or in the Off-state, and information of the detected sequences into a base station apparatus state identification unit 311. Based on the input information, the base station apparatus state identification unit 311 discriminates and stores a state of the pico base station apparatus whose discovery signal is detected. When detecting the discovery signals of a plurality of pico base station apparatuses, the base station apparatus state identification unit 311 stores the states of each of the pico base station apparatuses, and when transitions of the states are detected by the discovery signal detection unit 310, updates the states of each of the pico base station apparatuses. When making a request of resource allocation (UL grant) of the uplink, the base station apparatus state identification unit 311 inputs state information of each of the pico base station apparatuses to the UL control information generation unit 312 in order to transmit the SR or the RACH signal for the resource allocation request of the uplink to the macro base station apparatus or the pico base station apparatus in the On-state.

To the UL control information generation unit 312, information of the ACK/NACK is input from a P/S unit 3075 which is not illustrated and information of the CSI is input from the channel estimation unit 308. The ACK/NACK and the cyclic CSI are arranged in the PUCCH and transmitted through a UL control information transmission unit 313 and a transmit antenna 314. When a transmission request to transmit the acyclic CSI is made by the DCI format, the UL control information generation unit 312 generates and transmits a transmission signal of the PUSCH. In this case, a DFTS-OFDM (Discrete Fourier Transform Spread OFDM, also referred to as a SC-FDMA) signal is used for the transmission of the PUSCH. When making a resource allocation request of the uplink, the UL control information generation unit 312 generates and transmits the SR or the RACH signal. In this case, the SR is transmitted by the PUCCH and the RACH signal uses a resource determined in advance. When transmitting the SR or the RACH signal, the UL control information generation unit 312 performs the transmission to a serving cell (or CC: Component Carrier) formed by the pico base station apparatus in the On-state or the macro base station apparatus by using the states of each of the pico base station apparatus, which are input from the base station apparatus state identification unit 311.

As described above, in the present embodiment, since the pico base station apparatus transmits discovery signals of different sequences by using the same resource in the On-state and the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatuses and the macro base station apparatus. Accordingly, it is possible to improve the system throughput.

(Modified Example 1 of First Embodiment)

In the present modified example, exemplary configurations of the macro base station apparatus, the pico base station apparatus, and the terminal apparatus are similar to those of the first embodiment, and are illustrated in FIG. 2, FIG. 4, and FIG. 5, respectively. Thus, only different processing will be described and the description for similar processing will be omitted in the present modified example. Here, the discovery signal generation unit 212 of the pico base station apparatus generates a sequence with the formula (1) to the formula (4). However, the calculation of the formula (5) is changed according to whether the pico base station apparatus is in the On-state or the Off-state. First, when the pico base station apparatus is in the On-state, a physical cell ID (or a virtual cell ID) is used for $N_{cell\_id}$ of the formula (5) unless configuration of $N_{csi\_id}$ is notified in a higher layer. When the pico base station apparatus is in the Off-state, $N_{off\_id}$ is used instead of $N_{cell\_id}$ of the formula (5). $N_{off\_id}$ is a value which is used for generating the sequence of the discovery signal by the pico base station apparatus in the Off-state notified by RRC or the like to the terminal apparatus in advance. Values different after each base station apparatus may be used or a common value may be used for $N_{off\_id}$. The sequence of the discovery signal transmitted by the pico base station apparatus in the Off-state has the initial value changed in the modified example of the present embodiment, but without limitation to this example, may be differentiated from the sequence of the discovery signal transmitted by the pico base station apparatus in the On-state by using a different generation method for generating the sequence from the formula (2) to the formula (4) or may be changed to the sequence of the PSS, the SSS, or the CRS.

The discovery signal generation unit 212 multiplies the generated discovery signal by a code of [+1, −1] or [+1, +1] according to whether an antenna port number is an even number or an odd number, and inputs the resultant to the discovery signal multiplexing units 213-1 to 213-M. The discovery signal multiplexing units 213-1 to 213-M multiplex it with other transmission signals. The RE to be multiplexed with the discovery signal is arranged in a k-th sub-carrier and an l-th OFDM symbol. k and l are respectively defined by the following formulas.

[Expression 9]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad \text{formula (9)}$$

[Expression 10]

$$l = l' + \begin{cases} l'' & \text{CSI reference signal configuration 0-19, normal cyclic prefix} \\ 2l'' & \text{CSI reference signal configuration 20-31, normal cyclic prefix} \\ l'' & \text{CSI reference signal configuration 0-27, extended cyclic prefix} \end{cases} \quad \text{formula (10)}$$

In the formulas, k' and l' are values determined by a configuration number of the CSI-RS and the number of CSI-RSs, and l" is 0 or 1. In this manner, the pico base station apparatus in the On-state transmits the discovery signal by the processing similar to that of the signal of the CSI-RS. In addition, the pico base station apparatus in the Off-state transmits the discovery signal of the different sequence by using the RE of the CSI-RS. The pico base station apparatus uses the same configuration number of the CSI-RS in the On-state and the Off-state in the present modified example, but different configuration numbers may be notified by the macro base station apparatus or the pico base station apparatus to the terminal apparatus and applied.

In the example of the present embodiment, the sequence of the discovery signal is changed by switching $N_{cell\_id}$ and $N_{off\_id}$ to be notified to the terminal apparatus according to whether the pico base station apparatus is in the On-state or the Off-state. However, the invention is not limited to this example, and $N_{off\_id}$ may not be notified to the terminal apparatus but may be determined uniquely based on $N_{off\_id}$. For example, a term of $N_{state}$ may be added to the formula (5) and the value is obtained in such a manner that $N_{state}=0$ when the pico base station apparatus is in the On-state and $N_{state}$ is non-zero when the pico base station apparatus is in the Off-state. Note that, without limitation to such an example, $N_{off\_id}$ may be calculated based on $N_{cell\_id}$. For example, it may be set that $N_{off\_id}=503-N_{cell\_id}$ or another calculation method may be used.

In the terminal apparatus, the discovery signal separation units 304-1 to 304-N perform separation into the discovery signal and other signals and input each of them to the discovery signal detection unit 310 and the control signal separation units 305-1 to 305-N. Here, the RE used for transmission of the discovery signal is calculated with the formula (9) and the formula (10) in the present embodiment. The discovery signal detection unit 310 checks detection and a state of the pico base station apparatus from the discovery signal transmitted from the pico base station apparatus. The discovery signal detection unit 310 performs detection of the discovery signal by assuming that any of the sequences of the discovery signals transmitted by the pico base station apparatus in the On-state and the Off-state is transmitted. Specifically, by taking a correlation between the sequence generated with the formulas (2) to (5) by using $N_{cell\_id}$ and the sequence generated by $N_{off\_id}$ associated with $N_{cell\_id}$, which one of the sequences is transmitted is judged. To the discovery signal detection unit 310, $N_{off\_id}$ is input in advance by the control information detection unit 309. When a correlation value is small with respect to both of the sequences, the terminal apparatus may judge that no pico base station apparatus allowing connection exists. In addition, the discovery signal detection unit 310 measures reception quality for a plurality of frames or sub-frames by discovery signals transmitted with the use of the same sequence and performs RRM measurement. The discovery signal detection unit 310 inputs information of the sequences of the discovery signals transmitted by the pico base station apparatus in the On-state and in the Off-state and information of the detected sequences to the base station apparatus state identification unit 311.

As described above, in the present embodiment, since the pico base station apparatus transmits discovery signals of different sequences by using the same resource in the On-state and the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatuses and the macro base station apparatus. Accordingly, it is possible to improve the system throughput.

(Modified Example 2 of the First Embodiment)

In the present modified example, exemplary configurations of the macro base station apparatus, the pico base station apparatus, and the terminal apparatus are similar to those of the first embodiment, and are illustrated in FIG. 2, FIG. 4, and FIG. 5, respectively. Thus, only different processing will be described and the description for similar processing will be omitted in the present modified example. The discovery signal generation unit 212 of the pico base station apparatus generates a Zadoff-Chu sequence, and generates a sequence with the following formula.

$$d_u(n) = \begin{cases} e^{-j\frac{\pi u n(n+1)}{63}} & n = 0, 1, \ldots 30 \\ e^{-j\frac{\pi u (n+1)(n+2)}{63}} & n = 31, 32, \ldots 61 \end{cases} \quad \text{[Expression 11]}$$

In the formula, u denotes a root sequence index of the Zadoff-Chu sequence, and is determined based on a value of $N_{cell\_id}$ (mod 3) when the pico base station apparatus is in the On-state, and is determined based on a value of $N_{off\_id}$ (mod 3) when the pico base station apparatus is in the Off-state. The discovery signal generation unit 212 inputs the generated discovery signal to the discovery signal multiplexing units 213-1 to 213-M. The discovery signal multiplexing units 213-1 to 213-M multiplex it with other transmission signals. The RE to be multiplexed with the discovery signal is arranged in a k-th sub-carrier and the last OFDM symbols in a slot 0 and a slot 10. k is defined by the following formula.

$$k = n - 31 + \frac{N_{DL\_RB} N_{RB\_SC}}{2} \quad \text{[Expression 12]}$$

In the formula, $N_{DL\_RB}$ denotes the number of RBs formed in the downlink, and $N_{RB\_SC}$ denotes the number of sub-carriers forming the RB. In this manner, the pico base station apparatus in the On-state transmits the discovery signal by the processing similar to that of a signal of a PSS (Primary Synchronization Signal). In addition, the pico base station apparatus in the Off-state transmits the discovery signal of the different sequence by using the RE of the PSS. In the present modified example, without limitation to the PSS, the pico base station apparatus in the On-state may transmit the discovery signal by similar processing to that of a signal of an SSS (Secondary Synchronization Signal), and the pico base station apparatus in the Off-state may transmit the discovery signal of the different sequence by using the RE of the PSS.

In the example of the present embodiment, the sequence of the discovery signal is changed by switching $N_{cell\_id}$ and $N_{off\_id}$ notified to the terminal apparatus according to whether the pico base station apparatus is in the On-state or the Off-state. However, the invention is not limited to this example, and $N_{off\_id}$ may not be notified to the terminal apparatus but may be determined uniquely based on $N_{cell\_id}$. For example, a term of $N_{state}$ may be added to the formula (5) and the value is obtained in such a manner that $N_{state}=0$ when the pico base station apparatus is in the On-state and $N_{state}$ is non-zero when the pico base station apparatus is in the Off-state. Note that, without limitation to such an example, $N_{off\_id}$ may be calculated based on $N_{cell\_id}$. For example, it may be set that $N_{off\_id}=503-N_{cell\_id}$ or another calculation method may be used.

As described above, in the present embodiment, since the pico base station apparatus transmits discovery signals of different sequences by using the same resource in the On-state and the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatus and the macro base station apparatus. Accordingly, it is possible to improve the system throughput.

(Second Embodiment)

In a second embodiment of the invention, description will be given for a case where a discovery signal transmitted by the pico base station apparatus is transmitted by using a different resource (OFDM symbol number and sub-carrier number) or a different cycle from the PSS, the SSS, the CRS, and the CSI-RS. In one example of the present embodiment, it is assumed that the pico base station apparatus transmits the discovery signal by using a similar resource even if the pico base station apparatus is in the On-state or the Off-state.

In the present embodiment, exemplary configurations of the macro base station apparatus, the pico base station apparatus, and the terminal apparatus are similar to those of the first embodiment, and are illustrated in FIG. 2, FIG. 4, and FIG. 5, respectively. Thus, only different processing will be described and the description for similar processing will be omitted in the present modified example. The discovery signal generation unit 212 of the pico base station apparatus generates different sequences in the On-state and the Off-state. For example, the pico base station apparatus uses the Zadoff-Chu sequence for the discovery signal and the macro base station apparatus or the pico base station apparatus notifies the terminal apparatus of a root index used in the On-state and a root index used in the Off-state. In this case, the discovery signal generation unit 212 generates the discovery signal with the formula (11) by the root index corresponding to the state of the pico base station apparatus. However, the present embodiment is not limited to the example in which the Zadoff-Chu sequence is used in both of the On-state and the Off-state, and the different sequence may be used in any one or both of them. For example, the sequence of the formula (1) to formula (4) may be used in any one or both of the On-state or the Off-state.

The discovery signal generation unit 212 inputs the generated discovery signal to the discovery signal multiplexing units 213-1 to 213-M. The discovery signal multiplexing units 213-1 to 213-M arrange the discovery signal in the RE which is determined in advance and used for transmission of the discovery signal and multiplex it with other transmission signals. In this case, information about the sequences of the discovery signals used when the pico base station apparatus is in the On-state and the Off-state is notified to the terminal apparatus and the state of the pico base station apparatus is identified by the discovery signal detection unit 310. Here, examples of the information about the sequences of the discovery signals used in the On-state and the Off-state include information of a root index of the Zadoff-Chu sequence, an initial value of the Gold sequence, and the sequence used for transmission.

As described above, in the present embodiment, since the pico base station apparatus transmits discovery signals of different sequences by using the same resource when the pico base station apparatus is the On-state and the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatus and the macro base station apparatus. Accordingly, it is possible to improve the system throughput.

(Third Embodiment)

In a third embodiment of the invention, description will be given for a method for identifying the state of the pico base station apparatus by the terminal apparatus by controlling an antenna port by which a discovery signal is transmitted according to whether the pico base station apparatus is in the On-state or the Off-state.

Figure 7:
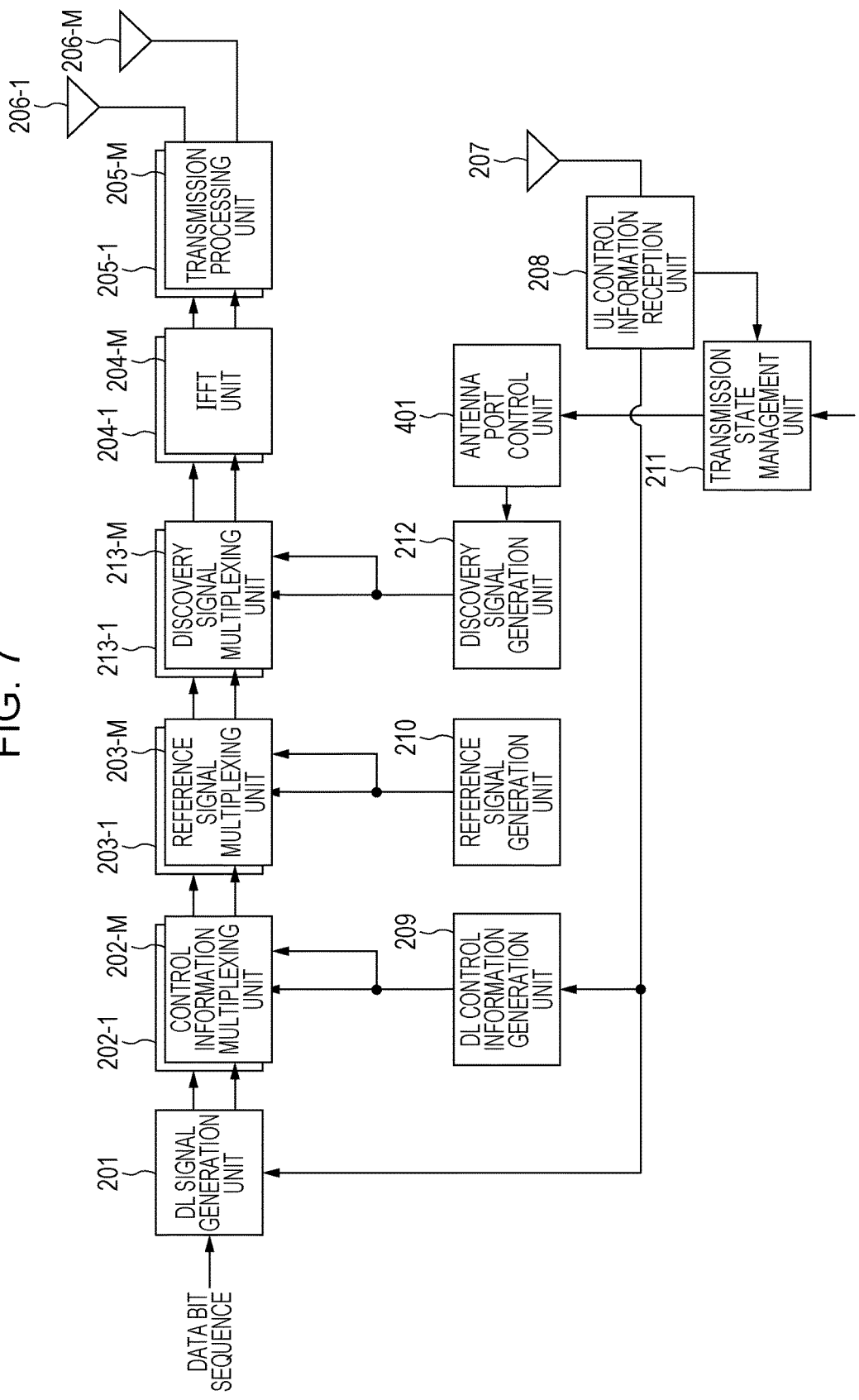
FIG. 7 illustrates one example of a configuration of the pico base station apparatus 11 according to the invention.

In the present embodiment, exemplary configurations of the macro base station apparatus and the terminal apparatus are similar to those of the first embodiment, and are illustrated in FIG. 2 and FIG. 5, respectively. However, the exemplary configuration of the pico base station apparatus is different and is illustrated in FIG. 7. The pico base station apparatus 11 of FIG. 7 is obtained by adding an antenna port control unit 401 to the pico base station apparatus 11 of the first embodiment illustrated in FIG. 4. Other configurations are similar. Thus, only processing different from that of the first embodiment will be described and the description for similar processing will be omitted in the present example.

To the antenna port control unit 401, state information indicating whether to be the On-state or the Off-state is input from the transmission state management unit 211. According to the information indicating whether to be the On-state or the Off-state, the antenna port control unit 401 determines an antenna port number for transmitting the discovery signal. For example, the pico base station apparatus in the On-state performs transmission with the antenna ports 0, 1, 2, and 3, and the pico base station apparatus in the Off-state uses only the antenna port 0. In this manner, the antenna port control unit 401 performs processing for reducing the number of antenna ports for performing transmission of the discovery signal in the case of the Off-state compared to the case of the On-state. In this case, a method for setting the number of antenna ports is not limited to the aforementioned example, and when a transition is made from the On-state to the Off-state, the number of antenna ports may be changed from 4 to 2 or the number of antenna ports may be changed from 2 to 1. In addition, the antenna port control unit 401 may use the antenna port 2 or 3 in the case of the Off-state and set the port which is not used by the terminal apparatus for RRM measurement so that the terminal apparatus differentiates the processing of RRM measurement between the On-state and the Off-state. In addition, the antenna port used in the case of the Off-state may be notified in advance to the terminal apparatus with the RRC or the like by the macro base station apparatus or the pico base station apparatus. In this case, the pico base station apparatus in the Off-state, when the antenna port used for transmission of the discovery signal in the Off-state is configured by the RRC, may transmit the discovery signal by the antenna port specified by the RRC, and when the antenna port used for transmission of the discovery signal is not configured by the RRC, transmit the discovery signal only by the antenna port 0. The antenna port number is also not limited to the aforementioned example, and antenna ports 15 to 22 may be used and the number of antenna ports may be reduced when a transition from the On-state to the Off-state is made, or other antenna port numbers may be used. When reducing the number of antenna ports, the pico base station apparatus in the Off-state may increase transmit power of the signal, which is transmitted from at least one of antenna ports used for transmission of the discovery signal, by the transmission processing units 205-1 to 205-M.

The antenna port number or the number of antenna ports for transmitting the discovery signal is input from the antenna port control unit 401 to the discovery signal generation unit 212, and the discovery signal generation unit 212 generates the discovery signal for each antenna port. The discovery signal generation unit 212 inputs the generated discovery signal to the discovery signal multiplexing units 213-1 to 213-M. The discovery signal multiplexing units 213-1 to 213-M arrange the discovery signal in the RE which is determined in advance and used for transmission of the discovery signal and multiplex it with other transmission signals. In this case, it is set that the resource of the discovery signal for each antenna port is determined in advance or notified.

The terminal apparatus performs detection of the discovery signal for each antenna port in the discovery signal detection unit 310. The discovery signal detection unit 310 calculates a correlation value between the sequence of the discovery signal for each antenna port and a reception signal, and identifies the number of antenna ports used for transmission of the discovery signal. In this case, information about the numbers of antenna ports and the antenna port numbers used for transmission of the discovery signal when the pico base station apparatus is in the On-state and the Off-state is input from the control information detection unit 309 to the discovery signal detection unit 310, and the discovery signal detection unit 310 identifies the state of the pico base station apparatus.

Note that, though only the number of antenna ports for transmitting the discovery signal is switched according to whether the pico base station apparatus is in the On-state or the Off-state in the example of the present embodiment, the sequence of the discovery signal may be also changed. Though information of the number of antenna ports for transmitting the discovery signal when the pico base station apparatus is in the On-state and the Off-state is notified to the terminal apparatus in the example of the present embodiment, the number of antenna ports for transmitting the discovery signal when the pico base station apparatus is in the On-state may be similar to the number of antenna ports for the CRS or the CSI-RS.

As described above, in the present embodiment, since the pico base station apparatus switches the number of antenna ports for transmitting the discovery signal according to whether the pico base station apparatus is in the On-state or the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatuses and the macro base station apparatus. Accordingly, it is possible to improve the system throughput.

(Fourth Embodiment)

Though the example of using resources such as the PSS/SSS, CRS, and the CSI-RS has been described in the previous embodiment, a part of the resources may be used. For example, it may be configured so that a sub-carrier used by the pico base station apparatus for transmitting the PSS/SSS is used, and not by transmitting the discovery signal in 2 or 4 OFDM symbols in one frame but by transmitting the discovery signal at a transmission interval such as one OFDM symbol in one frame or one OFDM symbol in two frames, control of the sequence and the number of antenna ports may be performed according to the state of the pico base station apparatus. In addition, the transmission interval of the discovery signal may be controlled according to whether the pico base station apparatus is in the On-state or the Off-state so that the terminal apparatus grasps the state of the pico base station apparatus. In this case, as to the transmission interval of the discovery signal, the configuration of the On-state or the Off-state is notified to the terminal apparatus. A configuration of a sub-frame for transmitting the discovery signal according to whether the pico base station apparatus is in the On-state or the Off-state may exist and the terminal apparatus may grasp the state of the pico base station apparatus based on a difference in the configuration.

As described above, in the present embodiment, since the pico base station apparatus switches a cycle or a configuration of the sub-frame for transmitting the discovery signal according to whether the pico base station apparatus is in the On-state or the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatuses and the macro base station apparatus. Accordingly, it is possible to improve the system throughput.

(Fifth Embodiment)

In the present embodiment, description will be given for a method for controlling an antenna port for transmitting the discovery signal and controlling a resource (RE) for transmitting the discovery signal according to whether the pico base station apparatus is in the On-state or the Off-state so that the terminal apparatus identifies the state of the pico base station apparatus. In the present embodiment, exemplary configurations of the macro base station apparatus, the terminal apparatus, and the pico base station apparatus are similar to those of the third embodiment, and are illustrated in FIG. 2, FIG. 5, and FIG. 7, respectively.

To the antenna port control unit 401, state information indicating whether to be the On-state or the Off-state is input from the transmission state management unit 211. The antenna port control unit 401 determines an antenna port number for transmitting the discovery signal according to information indicating whether to be the On-state or the Off-state. For example, the pico base station apparatus in the On-state performs transmission with the antenna ports 0, 1, 2, and 3, and the pico base station apparatus in the Off-state uses only the antenna port 0. In this manner, the antenna port control unit 401 performs processing for reducing the number of antenna ports for performing transmission of the discovery signal in the case of the Off-state compared to the case of the On-state. Here, only when the antenna port 0 is used, the RE for transmitting the discovery signal is calculated with the formula (6) to the formula (8) as ¼. When the terminal apparatus makes the RRM measurement by the discovery signal, however, accuracy of the RRM measurement and interference which depend on the number of REs used for transmission of the discovery signal have a trade-off relationship, and it is not necessarily better that the number of RE used for transmission of the discovery signal is smaller depending on a communication environment. Thus, in the case of the Off-state, the RE used for transmission of the discovery signal by the pico base station apparatus may be notified in advance to the terminal apparatus with the RRC or the like by the macro base station apparatus or the pico base station apparatus. For example, the terminal apparatus is notified that the RE used for transmission of the discovery signal by the pico base station apparatus in the Off-state is set as the RE used for transmitting the CRS by the antenna ports 0 and 1. In this case, the pico base station apparatus in the Off-state is able to transmit the discovery signal by the antenna port 0 by using the RE specified as described above. As a result, it is possible to double the RE allowing transmission of the discovery signal by the antenna port 0. Thus, a length of the sequence of the discovery signal transmitted by the antenna port 0 is switched between the On-state and the Off-state. In the example above, a sequence length of the discovery signal transmitted by the antenna port 0 in the case of the Off-state is twice that of the case of the On-state.

In this manner, by controlling the number of antenna ports and the number of REs by which the pico base station apparatus in the Off-state is able to transmit the discovery signal, a method for transmitting the discovery signal is able to be switched flexibly according to a communication environment. Without limitation to the control for the number of antenna ports and the number of REs by which the pico base station apparatus in the Off-state is able to transmit the discovery signal, control may be performed in such a manner that antenna port numbers are shared between the pico base station apparatus and the terminal apparatus with the use of control information (such as RRC). A method for setting the number of antenna ports is not limited to the aforementioned example, when a transition is made from the On-state to the Off-state, the number of antenna ports may be changed from 4 to 2 or the number of antenna ports may be changed from 2 to 1. The antenna port number is also not limited to the aforementioned example, and antenna ports 15 to 22 may be used and the number of antenna ports may be reduced when a transition from the On-state to the Off-state is made, or other antenna port numbers may be used. When reducing the number of antenna ports, the pico base station apparatus in the Off-state may increase transmit power of the signal, which is transmitted from at least one of antenna ports used for transmission of the discovery signal, by the transmission processing units 205-1 to 205-M.

The antenna port number or the number of antenna ports for transmitting the discovery signal is input from the antenna port control unit 401, and the discovery signal generation unit 212 generates the discovery signal for each antenna port. The discovery signal generation unit 212 inputs the generated discovery signal to the discovery signal multiplexing units 213-1 to 213-M. The discovery signal multiplexing units 213-1 to 213-M arrange the discovery signal in the RE which is notified in advance and used for transmission of the discovery signal and multiplex it with other transmission signals. In this case, it is set that the resource of the discovery signal for each antenna port has been notified.

The terminal apparatus performs detection of the discovery signal of each antenna port in the discovery signal detection unit 310. The discovery signal detection unit 310 calculates a correlation value between the sequence of the discovery signal of each antenna port and a reception signal, and identifies the number of antenna ports used for transmission of the discovery signal. In this case, information about the number of antenna ports and the antenna port numbers used for transmission of the discovery signal when the pico base station apparatus is in the On-state and the Off-state is input from the control information detection unit 309, and the discovery signal detection unit 310 identifies the state of the pico base station apparatus.

Note that, though only the number of antenna ports for transmitting the discovery signal is switched according to whether the pico base station apparatus is in the On-state or the Off-state in the example of the present embodiment, the sequence of the discovery signal may be also changed. Though information of the number of antenna ports for transmitting the discovery signal when the pico base station apparatus is in the On-state and the Off-state is notified to the terminal apparatus in the example of the present embodiment, the number of antenna ports for transmitting the discovery signal when the pico base station apparatus is in the On-state may be similar to the number of antenna ports for the CRS and the CSI-RS.

As described above, in the present embodiment, since the pico base station apparatus switches the number of antenna ports for transmitting the discovery signal according to whether the pico base station apparatus is in the On-state or the Off-state, the terminal apparatus is able to grasp the state of the pico base station apparatus. As a result, when the terminal apparatus makes a resource allocation request of the uplink, it is possible to avoid transmission of a signal to the pico base station apparatus in the Off-state and reduction in the overhead becomes possible. Further, it is also possible to prevent that the terminal apparatus makes a resource allocation request of the uplink to the pico base station apparatus in the Off-state and the pico base station apparatus makes a transition to the On-state, thus making it possible to reduce interference imparted to other pico base station apparatuses and the macro base station apparatus. Accordingly, it is possible to improve the system throughput.

A program which runs in the base station apparatus and the terminal apparatus concerning the invention is a program that controls a CPU and the like (program that causes a computer to function) such that the functions in the aforementioned embodiments concerning the invention are realized. The pieces of information handled by the apparatuses are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the embodiments described above are realized, but also by performing processing in cooperation with an operating system, other application programs or the like based on an instruction of the program, the functions of the invention are realized.

When being distributed in the market, the program is able to be stored in a portable recording medium and distributed or be transferred to a server computer connected through a network such as the Internet. In this case, a storage apparatus of the server computer is also included in the invention. A part or all of the base station apparatus and the terminal apparatus in the embodiments described above may be realized as an LSI which is a typical integrated circuit. Each functional block of the base station apparatus and the terminal apparatus may be individually formed into a chip, or a part or all thereof may be integrated and formed into a chip. Further, a method for making into an integrated circuit is not limited to the LSI and a dedicated circuit or a versatile processor may be used for realization. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the embodiments described above. The terminal apparatus of the invention of the present application is not limited to be applied to the mobile station apparatus, but, needless to say, is applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiments of the invention have been described in detail with reference to drawings, but specific configurations are not limited to the embodiments, and a design and the like which are not departed from the main subject of the invention are also included. The invention may be modified in various manners within the scope of the claims and an embodiment achieved by appropriately combining technical means disclosed in each of different embodiments is also encompassed in the technical scope of the invention. In addition, configurations obtained by replacing elements that have been described in the embodiments described above and that exert similar advantageous effects are also included.

Note that, the present international application claims priority from Japanese Patent Application No. 2014-003852 filed on Jan. 14, 2014, and the entire contents of Japanese Patent Application No. 2014-003852 are hereby incorporated herein by reference.

REFERENCE SIGNS LIST 10 macro base station apparatus
11, 12 pico base station apparatus
21, 22 terminal apparatus
101 DL signal generation unit
102-1 to 102-M control information multiplexing unit
103-1 to 103-M reference signal multiplexing unit
104-1 to 104-M IFFT unit
105-1 to 105-M transmission processing unit
106-1 to 106-M transmit antenna
107 receive antenna
108 UL control information reception unit
109 DL control information generation unit
110 reference signal generation unit
111 communication amount management unit
1011 S/P unit
1012-1 to 1012-C coding unit
1013-1 to 1013-C modulation unit
1014 precoding unit
1015-1 to 1015-M signal allocation unit
201 DL signal generation unit
202-1 to 202-M control information multiplexing unit
203-1 to 203-M reference signal multiplexing unit
204-1 to 204-M IFFT unit
205-1 to 205-M transmission processing unit
206-1 to 206-M transmit antenna
207 receive antenna
208 UL control information reception unit
209 DL control information generation unit
210 reference signal generation unit
211 transmission state management unit
212 discovery signal generation unit
213-1 to 213-M discovery signal multiplexing unit
301-1 to 301-N receive antenna
302-1 to 302-N reception processing unit
303-1 to 303-N FFT unit
304-1 to 304-N discovery signal separation unit
305-1 to 305-N control signal separation unit
306-1 to 306-N reference signal separation unit
307 reception signal detection unit
308 channel estimation unit
309 control information detection unit
310 discovery signal detection unit
311 base station apparatus state identification unit
312 UL control information generation unit
313 UL control information transmission unit
314 transmit antenna
3071 MIMO demultiplexing unit
3072-1 to 3072-M signal extraction unit
3073-1 to 3073-M demodulation unit
3074-1 to 3074-M decoding unit
3075 P/S unit
401 antenna port control unit

The invention claimed is:

1. A terminal apparatus which communicates with a base station apparatus, the terminal apparatus comprising:
reception processing circuitry configured and/or programmed to receive, from the base station apparatus, a Cell-specific Reference Signal (CRS) and a Radio Resource Control (RRC) information; and
discovery signal detection circuitry configured and/or programmed to detect, based on the RRC information, a discovery signal used for Radio Resource Management measurement, wherein
the CRS is generated by the base station apparatus by using a first physical cell ID,
the RRC information includes a second physical cell ID used for detection of the discovery signal, information on a transmission interval of the discovery signal, information on a resource to which the discovery signal is transmitted, and information on an antenna port through which the discovery signal is transmitted, and
the discovery signal detection circuitry detects the discovery signal using the information on the resource and the information on the antenna port.

2. The terminal apparatus according to claim 1, wherein the transmission interval indicated by the information on the transmission interval is larger than an interval in which the CRS is transmitted.

3. The terminal apparatus according to claim 1, wherein the RRC information includes a plurality of second physical cell IDs, and
the discovery signal detection circuitry detects the discovery signal for each of the plurality of second physical cell IDs.

4. The terminal apparatus according to claim 1, wherein the discovery signal detection circuitry interprets that a cell transmitted the discovery signal performing between On-state and Off-state, when detecting the discovery signal.

5. The terminal apparatus according to claim 1, wherein the first physical cell ID is information used to detect a first CSI-RS (Channel State Information Reference Signal),
the second physical cell ID is information used to detect a second CSI-RS,
the first CSI-RS is used to calculate channel state information,
the second CSI-RS is used as the discovery signal for RRM measurement, and
a transmission interval of the second CSI-RS is larger than a transmission interval of the first CSI-RS.

6. The terminal apparatus according to claim 1, wherein the first physical cell ID is a value different from the second physical cell ID.

7. The terminal apparatus according to claim 1, wherein the first physical cell ID is information used to generate a first CSI-RS (Channel State Information Reference Signal), PSS (Primary Synchronization Signal), and SSS (Secondary Synchronization Signal), and the discovery signal detection circuitry detects the discovery signal from a resource different from resources to which the CRS, the first CSI-RS, the PSS, and the SSS are transmitted.

8. A communication method of a terminal apparatus that communicates with a base station apparatus, the method comprising:

a step of receiving, from the base station apparatus, a Cell-specific Reference Signal (CRS) and a Radio Resource Control (RRC) information; and a step of detecting, based on the RRC information, a discovery signal used for Radio Resource Management measurement, wherein the CRS is generated by the base station apparatus by using a first physical cell ID, the RRC information includes a second physical cell ID used for detection of the discovery signal, information on a transmission interval of the discovery signal, information on a resource to which the discover signal is transmitted and information on an antenna port through which the discovery signal is transmitted, and the discovery signal detection circuitry detects the discovery signal using the information on the resource and the information on the antenna port.

* * * * *